(12) United States Patent
Owejan et al.

(10) Patent No.: US 8,101,322 B2
(45) Date of Patent: Jan. 24, 2012

(54) CONSTANT CHANNEL CROSS-SECTION IN A PEMFC OUTLET

(75) Inventors: Jon P. Owejan, Honeoye, NY (US); Thomas W. Tighe, Bloomfield, NY (US); Thomas A. Trabold, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 919 days.

(21) Appl. No.: 11/734,951

(22) Filed: Apr. 13, 2007

(65) Prior Publication Data
US 2008/0254339 A1 Oct. 16, 2008

(51) Int. Cl.
*H01M 8/04* (2006.01)

(52) U.S. Cl. .................................................. 429/514

(58) Field of Classification Search .............. 429/12–46, 429/400–535
See application file for complete search history.

(56) References Cited

U.S. PATENT DOCUMENTS

| | | | | |
|---|---|---|---|---|
| 4,175,165 A * | 11/1979 | Adlhart | ............................ | 429/30 |
| 6,989,214 B2 * | 1/2006 | Mao et al. | ........................ | 429/35 |
| 2001/0019792 A1 | 9/2001 | Wozniczka et al. | | |
| 2003/0031914 A1 | 2/2003 | Frank et al. | | |
| 2004/0209150 A1 | 10/2004 | Rock et al. | | |
| 2005/0271909 A1 * | 12/2005 | Bai et al. | ......................... | 429/13 |

FOREIGN PATENT DOCUMENTS

| CN | 1839509A D1 | 9/2006 |
|---|---|---|
| DE | 2831799 C2 | 8/1986 |

* cited by examiner

Primary Examiner — Basia Ridley
Assistant Examiner — Jonathan G Leong
(74) Attorney, Agent, or Firm — Fraser Clemens Martin & Miller LLC; J. Douglas Miller

(57) ABSTRACT

A plate for a fuel cell is disclosed, wherein an inlet aperture is disposed at a first end of the plate and an outlet aperture is disposed at a second end of the plate. The plate includes a first side and a second side. The first side of the plate has a flow field formed therein between the inlet aperture and the outlet aperture, the flow field having a plurality of flow channels formed therein, the plurality of flow channels in communication with a plurality of outlet ports formed in the plate. The second side of the plate has a plurality of drainage channels formed therein adjacent the outlet aperture, the plurality of drainage channels in fluid communication with the outlet ports and the outlet aperture, wherein a cross-sectional area occupied by each of the plurality of flow channels is substantially equal to a cross-sectional area occupied by each of the plurality of drainage channels.

6 Claims, 3 Drawing Sheets

CONSTANT CHANNEL CROSS-SECTION IN A PEMFC OUTLET

FIELD OF THE INVENTION

The invention relates to a fuel cell and more particularly to a bipolar plate for a fuel cell.

BACKGROUND OF THE INVENTION

Fuel cells are increasingly being used as a power source in a wide variety of applications. For example, a fuel cell system has been proposed for use in vehicles as a replacement for internal combustion engines, for example. Such a system is disclosed in commonly owned U.S. Pat. App. Pub. No. 2004/0209150, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which directly combine a fuel, e.g. hydrogen, and an oxidant, e.g. oxygen, to produce electricity. The oxygen is typically supplied by an air stream. The hydrogen and oxygen combine to form water. Other fuels can be used, e.g. natural gas, methanol, gasoline, and coal-derived synthetic fuels.

One type of fuel cell known in the art is a proton exchange membrane (PEM). The basic components of a PEM fuel cell are two electrodes separated by a polymer membrane electrolyte. Each electrode is coated on one side with a thin catalyst layer. The electrodes, catalyst, and membrane together form a membrane electrode assembly (MEA).

In a typical PEM fuel cell, the MEA is sandwiched between "anode" and "cathode" diffusion mediums (DM's) or diffusion layers that are formed from a resilient, conductive, and gas permeable material such as carbon fabric or paper. The DM's serve as the primary current collectors for the anode and cathode, as well as provide mechanical support for the MEA. The DM's and MEA are pressed between a pair of electronically conductive plates, also known as bipolar plates, which serve as secondary current collectors for collecting the current from the primary current collectors. The plates conduct current between adjacent cells internally of the stack in the case of bipolar plates and conduct current externally of the stack in the case of monopolar plates at the end of the stack.

The bipolar plates each include at least one active region that distributes the gaseous reactants over the major faces of the anode and cathode. These active regions, also known as flow fields, typically include a plurality of lands which engage the DM and define a plurality of grooves or flow channels therebetween. The channels supply the hydrogen and the oxygen to the electrodes on either side of the PEM from an inlet manifold. In particular, the hydrogen flows through the channels to the anode where the catalyst promotes separation into protons and electrons. On the opposite side of the PEM, the oxygen flows through the channels to the cathode where the oxygen attracts the hydrogen protons through the PEM. The electrons are captured as useful energy through an external circuit and are combined with the protons and oxygen to produce water vapor at the cathode side.

The reactants typically include water in the form of water vapor for humidification of the PEM. On the anode side of the bipolar plate, the concentration of water vapor increases at the outlet region due to the consumption of the hydrogen fuel in the cell. Likewise, the concentration of water vapor increases on the cathode side of the bipolar plate due to the formation of water as the hydrogen is oxidized. The water vapor must be managed to inhibit liquid water accumulation within the flow channels.

The water vapor is typically propelled through the flow channels and into an outlet manifold by a velocity of the reactants flowing through the flow channels. The increasing concentration of water vapor at the outlet region facilitates formation of liquid water in the flow channels. Any liquid water that forms in the flow channels is typically propelled through the flow channels and into the outlet manifolds.

A typical flow field includes a quantity of individual flow channels adapted to discharge the water into a common port. The quantity of individual flow channels may combine to form a larger channel in an outlet region. The ports and larger channels generally lead into the outlet manifold and take up an increased cross-sectional area compared to the individual flow channels in the flow field. The increased cross-sectional area taken up by the ports and the larger channels allow liquid water to accumulate. However, the velocity of the reactants flowing through the flow field is often not sufficient to propel the liquid water through the ports and channels and into the outlet manifold. Consequently, the accumulated water can block the flow of the reactants through the channels. The accumulation of water in the channels is typically referred to as "flooding" or "stagnation." A flooded fuel cell can have reduced electrical power output as the blocked channels starve the fuel cell of the reactants needed to meet a desired electrical output.

It would be desirable to produce a plate for a fuel cell wherein a flow field of the plate is adapted to minimize the accumulation of liquid water at an outlet region of the plate.

SUMMARY OF THE INVENTION

Compatible and attuned with the present invention, a plate for a fuel cell having a flow field adapted to minimize an accumulation of liquid water at an outlet region of the plate has surprisingly been discovered.

In one embodiment, a monopolar plate for a fuel cell comprises a plate having an inlet aperture formed in a first end thereof and an outlet aperture formed in a second end thereof, a first side of the plate having a flow field formed between the inlet aperture and the outlet aperture, the flow field including a plurality of flow channels formed therein, the plurality of flow channels in communication with a plurality of outlet ports formed in the plate, a second side of the plate having a plurality of drainage channels formed therein adjacent the outlet aperture, the plurality of drainage channels providing fluid communication between the outlet ports and the outlet aperture, wherein a cross-sectional area occupied by each of the plurality of flow channels is substantially equal to a cross-sectional area occupied by each of the plurality of drainage channels.

In another embodiment, a bipolar plate for a fuel cell comprises a first monopolar plate and a second monopolar plate, the first and second monopolar plates being joined and having an inlet aperture disposed at a first end and an outlet aperture disposed at a second end, wherein at least one of the first monopolar plate and the second monopolar plate includes: a first side of the plate having a flow field formed between the inlet aperture and the outlet aperture, the flow field including a plurality of flow channels formed therein, the plurality of flow channels in communication with a plurality of outlet ports formed in the plate, a second side of the plate having a plurality of drainage channels formed therein adjacent the outlet aperture, the plurality of drainage channels providing fluid communication between the outlet ports and the outlet aperture, wherein a cross-sectional area occupied by each of the plurality of flow channels is substantially equal to a cross-sectional area occupied by each of the plurality of drainage channels.

In a further embodiment, a fuel cell stack comprises at least one fuel cell having a membrane electrode assembly with an anode layer and a cathode layer, the membrane electrode assembly being disposed between a pair of bipolar plates, each bipolar plate having: a first monopolar plate and a second monopolar plate, the first and second monopolar plates being joined and having an inlet aperture disposed at a first end and an outlet aperture disposed at a second end, wherein at least one of the first monopolar plate and the second monopolar plate includes: a first side of the plate having a flow field formed between the inlet aperture and the outlet aperture, the flow field including a plurality of flow channels formed therein, the plurality of flow channels in communication with a plurality of outlet ports formed in the plate, a second side of the plate having a plurality of drainage channels formed therein adjacent the outlet aperture, the plurality of drainage channels providing fluid communication between the outlet ports and the outlet aperture, wherein a cross-sectional area occupied by each of the plurality of flow channels is substantially equal to a cross-sectional area occupied by each of the plurality of drainage channels.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
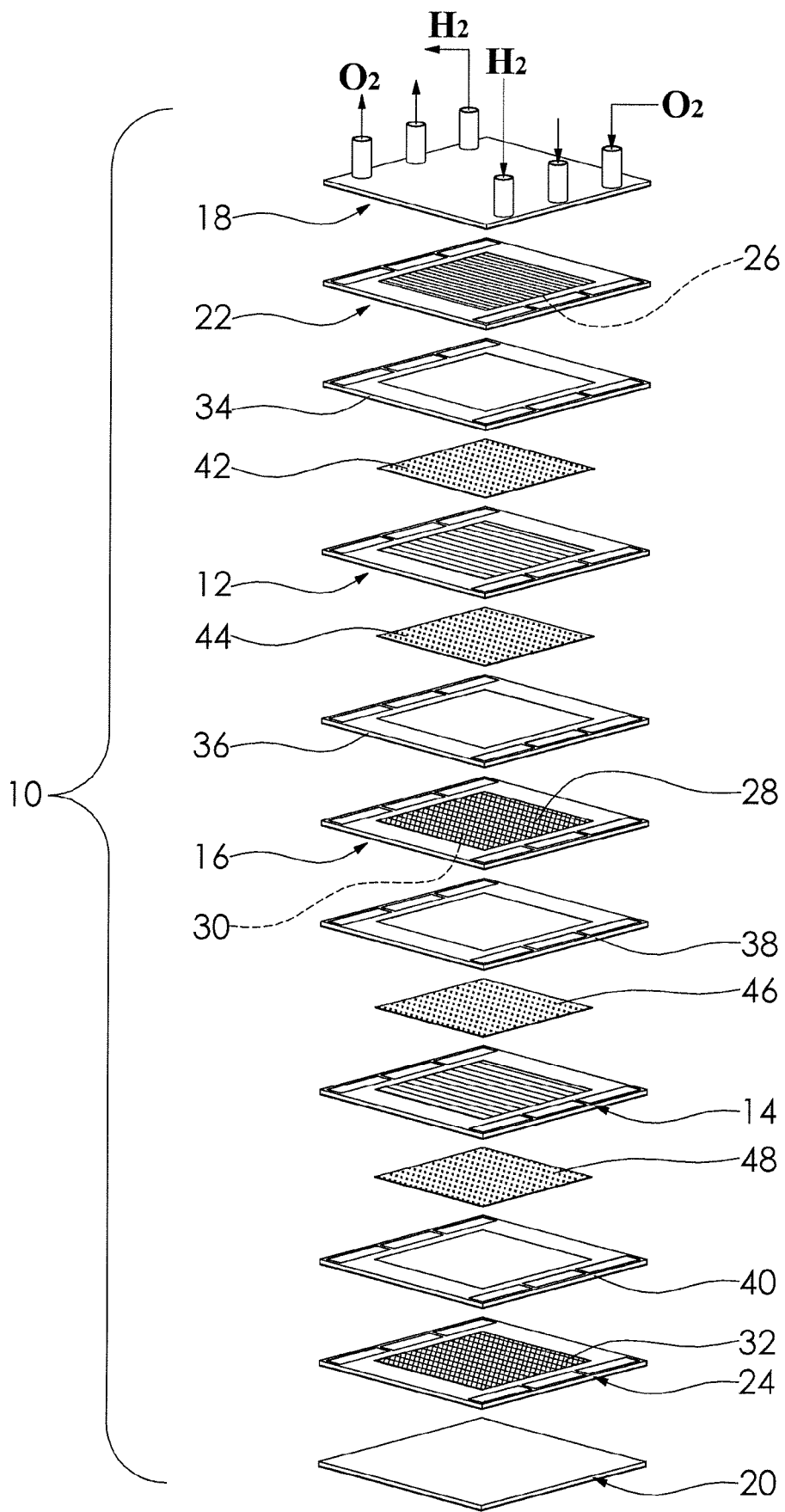
FIG. 1 is an exploded perspective view of an illustrative fuel cell stack.

FIG. 1 shows a two-cell bipolar PEM fuel cell stack 10. Although a bipolar PEM fuel cell stack is shown, it is understood that other fuel cell types and configurations can be used without departing from the scope and spirit of the invention. It is also understood that fuel cell stacks having more cells and plates can be and typically are used.

The fuel cell stack 10 includes a first membrane-electrode-assembly (MEA) 12 and a second membrane-electrode-assembly (MEA) 14. An electrically conductive, liquid-cooled, bipolar plate 16 is disposed between the first MEA 12 and the second MEA 14. The first MEA 12, the second MEA 14, and the bipolar plate 16 are stacked between clamping plates 18, 20 and monopolar end plates 22, 24. The clamping plates 18, 20 are electrically insulated from the monopolar end plates 22, 24.

A working face of each of the monopolar end plates 22, 24, as well as both working faces of the bipolar plate 16, include a plurality of channels 26, 28, 30, 32 formed therein. The channels 26, 28, 30, 32 define a "flow field" for distribution of a fuel and an oxidant gas over the faces of the MEA's 12, 14. In the embodiment of the invention described herein, the fuel is hydrogen and the oxidant is oxygen, although it is understood that other fuels and oxidants can be used as desired.

Nonconductive gaskets 34, 36, 38, 40 are respectively disposed between the monopolar end plate 22 and the first MEA 12, the first MEA 12 and the bipolar plate 16, the bipolar plate 16 and the second MEA 14, and the second MEA 14 and the monopolar end plate 24. The gaskets 34, 36, 38, 40 provide a seal and electrically insulate the monopolar end plate 22 and the first MEA 12, the first MEA 12 and the bipolar plate 16, the bipolar plate 16 and the second MEA 14, and the second MEA 14 and the monopolar end plate 24.

Gas-permeable diffusion media 42, 44, 46, 48 abut respective electrode faces of the first MEA 12 and the second MEA 14. The diffusion media 42, 44, 46, 48 are respectively disposed between the monopolar end plate 22 and the first MEA 12, the first MEA 12 and the bipolar plate 16, the bipolar plate 16 and the second MEA 14, and the second MEA 14 and the monopolar end plate 24.

The bipolar plate 16 is typically formed from two monopolar plates (shown in FIG. 2), although the bipolar plate 16 can be formed otherwise as desired. The monopolar plates include an anode plate (not shown) and a cathode plate (not shown), for example. The anode plate and the cathode plate typically are joined and cooperate to form a coolant chamber therebetween. The channels 28 are formed in the anode plate and channels 30 are formed in the cathode plate to define the respective flow fields.

Figure 2:
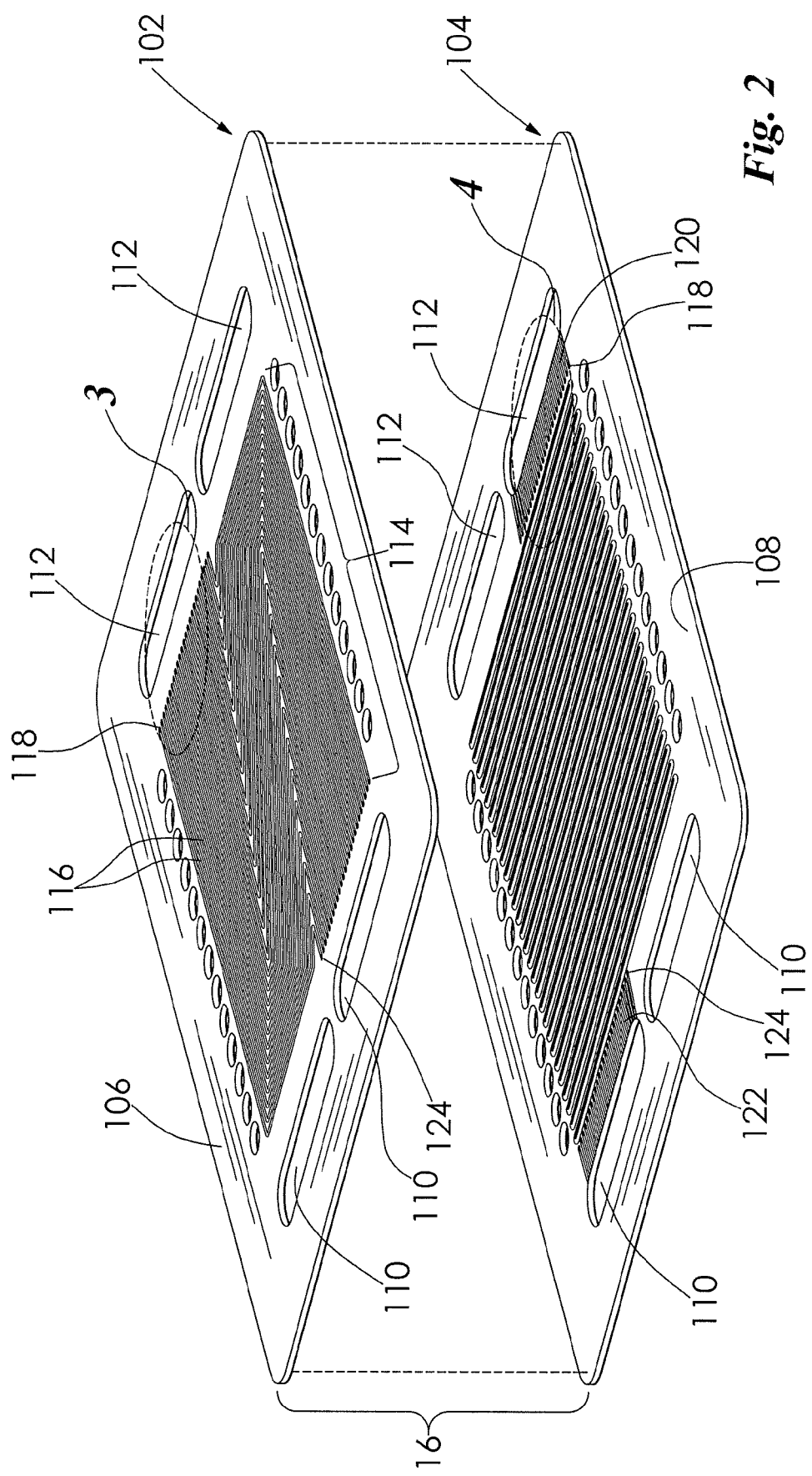
FIG. 2 is an exploded perspective view of a bipolar plate including a first monopolar plate and a second monopolar plate according to an embodiment of the invention.

FIG. 2 shows the bipolar plate 16 according to an embodiment of the present invention. The bipolar plate includes a first monopolar plate 102 and a second monopolar plate 104. It should be understood that the structure of the first and second monopolar plates 102, 104 may be substantially the same, and structural descriptions of each of the monopolar plates 102, 104 may be equally applicable to either of the monopolar plates 102, 104.

Illustratively, the first monopolar plate 102 has a first side 106 and a second side (not shown). The second monopolar plate 104 has a first side (not shown) and a second side 108. The second side of the first monopolar plate 102 and the second side 108 of the second monopolar plate 104 are joined together in substantial vertical stacked alignment to form the bipolar plate 16. It should be understood the monopolar plates 102, 104 can be joined by welding, adhesive, or other joining means as desired. Each of the first monopolar plate 102 and the second monopolar plate 104 include a pair of inlet apertures 110 and a pair of outlet apertures 112 formed therein. When joined, the inlet apertures 110 and the outlet apertures 112 of the monopolar plates 102, 104 respectively form an inlet manifold (not shown) and an outlet manifold (not shown).

As a nonlimiting example, a flow field 114 is formed in the first side 106 of the first monopolar plate 102. It should be appreciated that a flow field (not shown) is formed in the first side of the second monopolar plate 104. The flow field 114 is formed, for example, between the inlet apertures 110 and the outlet apertures 112.

Figure 3:
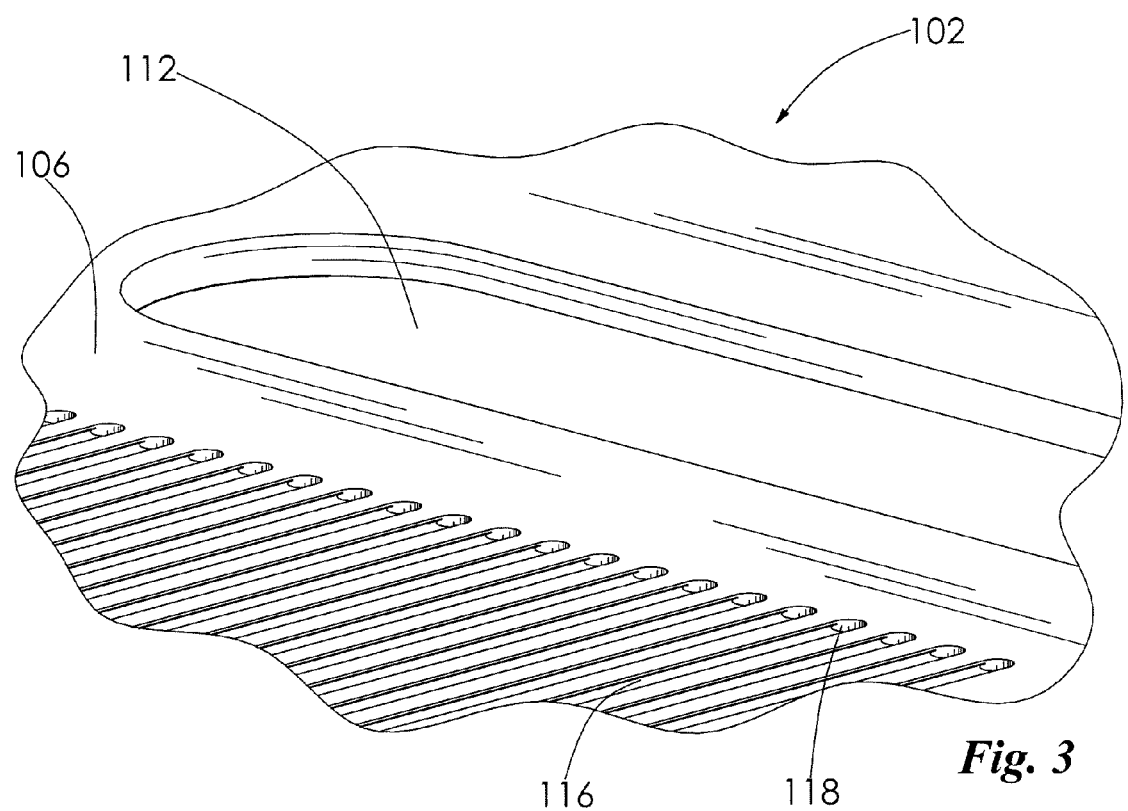
FIG. 3 is an enlarged, fragmentary perspective view of the first monopolar plate in FIG. 2 showing an outlet region formed in a first side of the first monopolar plate.

An enlarged view of a portion of the first side 106 of the first monopolar plate 102 is depicted in FIG. 3. It should be appreciated that a structure of the first side of the second monopolar plate 104 is substantially the same as a structure of the first side 106 of the first monopolar plate 102 described herein.

As shown in FIGS. 2 and 3, the flow field 114 of the first side 106 includes a plurality of flow channels 116 formed therein. As a nonlimiting example, a cross-sectional area occupied by each of the plurality of flow channels 116 is substantially constant along a length thereof. The flow channels 116 terminate at a plurality of outlet ports 118. The outlet ports 118 have a substantially circular shape, for example. It should be understood that other shapes can be used for the outlet port 118 as desired.

The outlet ports 118 are apertures formed in the monopolar plates 102, 104. One of the plurality of outlet ports 118 is typically in communication with only one of the plurality of the flow channels 114.

Figure 4:
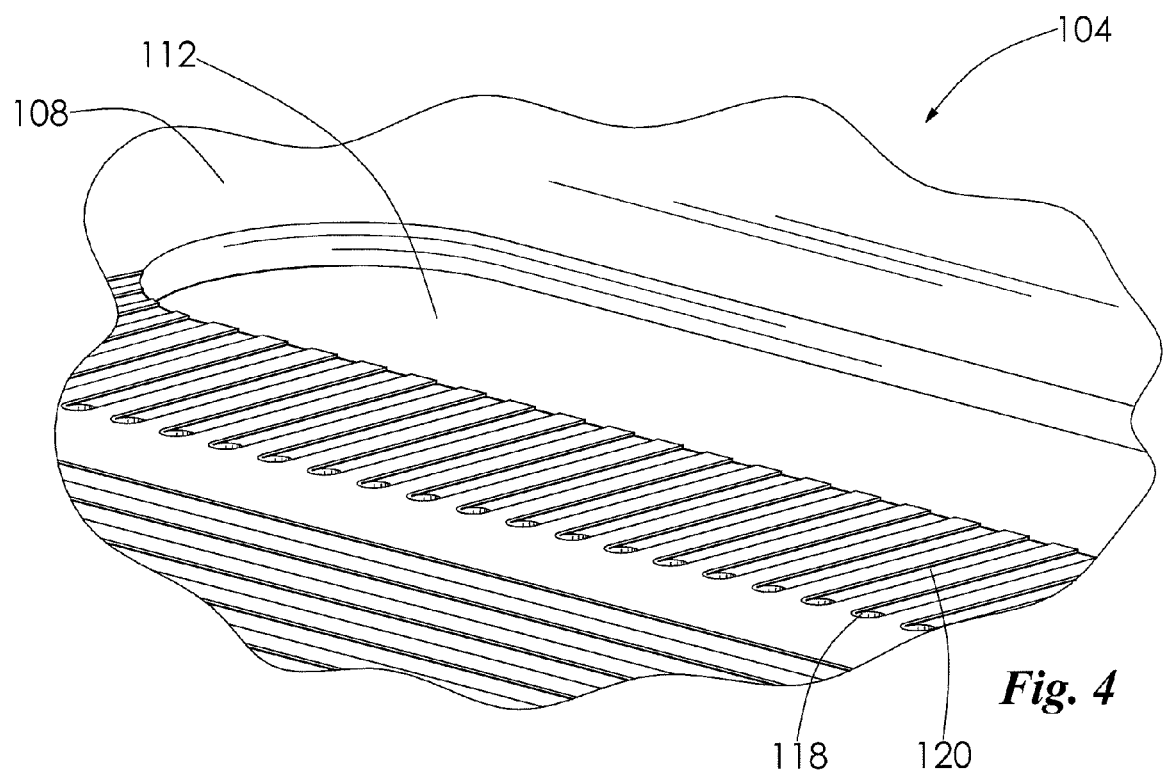
FIG. 4 is an enlarged, fragmentary perspective view of the second monopolar plate in FIG. 2 showing an outlet region formed in a second side of the second monopolar plate.

An enlarged view of a portion of the second side 108 of the second monopolar plate 104 is shown in FIG. 4. It should be appreciated that a structure of the second side of the first monopolar plate 102 is substantially the same as a structure of the second side 108 of the second monopolar 104 described herein.

In particular, FIG. 4 shows a plurality of drainage channels 120 formed in the second side 108 of the second monopolar plate 104. In the embodiment shown, a cross-sectional area occupied by each of the drainage channels 120 is substantially constant along a length thereof. Illustratively, one of the plurality of drainage channels 120 originates at one of the plurality of outlet ports 118 and terminates at the outlet apertures 112. The flow channels 116, outlet ports 108, and drainage channels 120 cooperate to provide flow paths for an exhaust stream (not shown) of the reactants to the outlet apertures 112. In a particular embodiment, one of the plurality of flow channels, one of plurality of drainage channels 120, and one of the plurality of outlet ports 118 cooperates to form a individual flow path for the exhaust stream.

As illustrated in FIGS. 2 to 4, the flow channels 116 are in fluid communication with the drainage channels 120. The cross-sectional area occupied by one or more of the plurality of flow channels 116 may be substantially the same as the cross-sectional area occupied by one or more of the plurality of drainage channels 120. It should be understood that different cross-sectional areas can be used for different cooperating pairs of the flow channels 116 and the drainage channels 120.

In a further embodiment, the one of the plurality of flow channels 116, the one of the plurality of drainage channels 120, and the one of the plurality of outlet ports 118 are in fluid communication with each other and form a unitary or single flow path from the flow field 114 to the outlet apertures 112. Illustratively, the flow path has a substantially equivalent width, i.e. the one of the plurality of flow channels 116, the one of the plurality of drainage channels 120, and the one of the plurality of outlet ports 118 have substantially the same width. It should be appreciated that different widths can be used for different flow paths. Accordingly, the unitary flow path formed by the one of the plurality of flow channels 116, the one of the plurality of drainage channels 120, and the one of the plurality of outlet ports 118 militates against an accumulation of liquid water.

With renewed reference to FIG. 2, it should be understood that the structure forming the flow channels 116, the drainage channels 120, and the outlet ports 118 can be employed to provide a constant cross-sectional fluid communication path from the inlet apertures 110 to the flow field 114. In an illustrative embodiment, the second side 108 of the second monopolar plate 104 includes supply channels 122 and inlet ports 124. The supply channels 122 are in communication with the inlet apertures 110 and the inlet ports 124. The flow channels 116 originate at the inlet port 124 and are in fluid communication with the inlet ports 124. The inlet apertures 110, the supply channels 122, and the inlet ports 124 cooperate to provide a flow path for a feed stream of the reactants to the flow field 114. It should be understood that the constant cross-sectional fluid communication path can be provided only between the inlet apertures 110 and the flow field 114, or only between the flow field 114 and the outlet apertures 112.

In operation, the feed stream of reactants is caused to flow from the inlet apertures 110, through the supply channels 122 and the inlet ports 124, and into the flow channels 116 of the flow field 114. The reactants include a fuel and an oxidant. In particular embodiments, the fuel is a hydrogen gas and the oxidant is oxygen, for example, from a supply of air. It should be understood that other fuels and oxidants can be used as desired.

The reactants pass through the flow field 114 and are expelled in the exhaust stream flowing through the outlet ports 118 and drainage channels 120, and into the outlet apertures 112. The reactants typically include water. A velocity of the inlet stream propels the water through the supply channels 122, the inlet ports 124, and flow channels 116. A velocity of the resulting exhaust stream propels the water through the outlet ports 118, the drainage channels 120, and into the outlet apertures 112.

It should be appreciated that, in the embodiment of the present invention described herein, the velocity of the feed stream and the exhaust stream is sufficient to propel liquid water through the flow path. The velocity of the feed and exhaust streams is sufficient to minimize an accumulation of water that would otherwise block the flow of reactants. One of ordinary skill in the art can see that the flow of reactants in the constant cross-sectional fluid communication path are less likely to be blocked than in a communication path where two or more channels empty into a common port.

A surface of the flow channels 116, the ports 118, and/or the drainage channels 120 may be provided with a hydrophilic coating disposed thereon. The hydrophilic coating reduces a friction between the surface of the flow path and any water contained therein. For example, the hydrophilic coating may minimize the friction between the surface of the flow path and any water contained therein by maintaining a thin film of water on the surface of the flow channels. The reduced friction facilitates a maximization of the propulsion of liquid water through the flow channels 116, the ports 118, and/or the drainage channels 120 at a given reactant velocity. The combination of the constant cross-sectional area flow path and the hydrophilic coating further minimizes the potential for flooding or stagnation in the fuel cell stack 10.

As nonlimiting examples, the hydrophilic coating can include at least one Si—O group, at least one polar group, and at least one group including a saturated or unsaturated carbon chain. In further embodiments the coating comprises at least one Si—O group and an Si—R group, wherein R includes a saturated or unsaturated carbon chain and the molar ratio of Si—R groups to Si—O groups ranges from ⅛ to ½. The hydrophilic coating may also be applied by any means sufficient for applying hydrophilic coatings. For example, a coating may be deposited using a plasma assisted chemical deposition process which includes a precursor gas, e.g. a siloxane gas, and further a second gas, e.g. oxygen. Suitable hydrophilic coatings can also include nanoparticles having a size ranging from 1 to 100 nanometers, wherein the nanoparticles include a compound having a Si—O group, a saturated or unsaturated carbon chain, and a polar group. It should be appreciated that other hydrophilic coatings can also be used.

The surface of the flow channels 116, the outlet ports 118, and the drainage channels 120 can also be textured to provide increased hydrophilicity. Surface textures can include a matte finish created, for example, by sandblasting. Patterns may also be etched, for example chemically, to provide a desired pattern or degree of roughness. Further, the surface of the flowfield may include microcorrugation or microchannels. It should be understood that other surface textures providing increased hydrophilicity can also be used.

An electrical load placed on the fuel cell stack 10 determines a minimum required flow rate or velocity of the reactants. The greater the electrical load, the greater a volume of reactants needed. The velocity of the reactants is adjusted to supply at least the minimum required volume of reactants for a given electrical load. It should be appreciated that the first and the second monopolar plates 102, 104 are especially susceptible to flooding when the electrical load applied to the fuel cell stack 10 is in a minimum range. The velocity of the reactants in conventional fuel cells is at a minimum when the electrical load is within the minimum range, and is less capable of propelling liquid water through the flow channels 116, the ports 118, and/or the drainage channels 120 and into the outlet apertures 112. However, the constant cross-sectional area of the flow channels 116, the outlet ports 118, and the drainage channels 120 of the present invention militate against the flooding of the bipolar plate 16 even at the minimum reactant velocities by maintaining a desired velocity of the reactants throughout the fuel cell plates 102, 104 which minimizes the accumulation of water therein.

As described herein, the fuel cell stack 10 typically includes the plurality of fuel cells connected in electrical series to provide a desired electrical output. It is desired that each cell within the stack 10 operates efficiently and contributes a substantially equal electrical potential to the total electrical output of the fuel cell stack 10. Any flooding of the fuel cells can reduce the electrical output thereof. When the electrical potential of one cell is reduced, the overall electrical output of the fuel cell stack 10 can be reduced and components of the fuel cell stack can be degraded. Such a variation in the electrical potential between the fuel cells reduces the efficiency and operational life of the fuel cell stack 10. The constant cross-sectional areas of the flow channel 116, the outlet port 118, and the drainage channel 120 promote uniform distribution of the reactants within the fuel cells and the substantially equal electrical potential between the fuel cells in the fuel cell stack 10, thereby maximizing the efficient operation of the fuel cell stack 10 by militating against flooding in the monopolar fuel cell plates 102, 104.

The fuel cell stack 10 may be operated at sub-freezing temperatures. The sub-freezing temperatures can result in the freezing of any water that has accumulated in the fuel cell stack 10. The frozen water or ice can block the channels 26, 28, 30, 32 within the fuel cell stack 10. Blockage of the channels 26, 28, 30, 32 limits the electrical output and may permanently damage the fuel cell plate 16, the MEA 12, 14, the diffusion media 42, 44, 46, 48, or other components of the fuel cell stack 10. By minimizing the accumulation of water in the bipolar plate 16, the flow channels 116, the outlet ports 118, and the drainage channels 122, the potential for ice to form in the fuel cell stack 10 is minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A monopolar plate for a fuel cell comprising:
 a plate having an inlet aperture formed in a first end thereof and an outlet aperture formed in a second end thereof, a first side of the plate having a flow field formed between the inlet aperture and the outlet aperture, the flow field including a plurality of flow channels formed therein, each of the flow channels in fluid communication with one of a plurality of outlet ports formed in the plate, a second side of the plate having a plurality of drainage channels formed therein adjacent the outlet aperture, each of the drainage channels providing fluid communication between one of the outlet ports and the outlet aperture,
 wherein a cross-sectional area occupied by each of the flow channels is equal to a cross-sectional area occupied by each of the drainage channels, and a width of each of the flow channels, a width of each of the outlet ports, and a width of each of the drainage channels are equal, to provide a constant cross-sectional area flow path, and
 wherein the constant cross-sectional area flow path militates against a potential for flooding or stagnation in the fuel cell.

2. The monopolar plate according to claim 1, wherein each of the outlet ports has a substantially circular shape in cross-section.

3. The monopolar plate according to claim 1, wherein a hydrophilic coating is disposed on a surface of each of the flow channels, each of the outlet ports, and each of the drainage channels, and wherein the hydrophilic material is a silica.

4. A bipolar plate for a fuel cell comprising:
 a first monopolar plate and a second monopolar plate, the first and second monopolar plates being joined and having an inlet aperture disposed at a first end and an outlet aperture disposed at a second end, wherein at least one of the first monopolar plate and the second monopolar plate includes:
  a first side of the plate having a flow field formed between the inlet aperture and the outlet aperture, the flow field including a plurality of flow channels formed therein, each of the flow channels in fluid communication with one of a plurality of outlet ports formed in the plate, a second side of the plate having a plurality of drainage channels formed therein adjacent the outlet aperture, each of the drainage channels providing fluid communication between one of the outlet ports and the outlet aperture, wherein a cross-sectional area occupied by each of the flow channels is equal to a cross-sectional area occupied by each of the drainage channels, and a width of each of the flow channels, a width of each of the outlet ports, and a width of each of the drainage channels are equal, to provide a constant cross-sectional area flow path, and wherein the constant cross-sectional area flow path militates against a potential for flooding or stagnation in the fuel cell.

5. The bipolar plate according to claim 4 wherein the first monopolar plate and the second monopolar plate are joined in substantially vertical alignment.

6. A fuel cell stack comprising:
 at least one fuel cell having a membrane electrode assembly with an anode layer and a cathode layer, the membrane electrode assembly being disposed between a pair of bipolar plates, each bipolar plate having:

a first monopolar plate and a second monopolar plate, the first and second monopolar plates being joined and having an inlet aperture disposed at a first end and an outlet aperture disposed at a second end, wherein at least one of the first monopolar plate and the second monopolar plate includes:

a first side of the plate having a flow field formed between the inlet aperture and the outlet aperture, the flow field including a plurality of flow channels formed therein, each of the flow channels in fluid communication with one of a plurality of outlet ports formed in the plate, a second side of the plate having a plurality of drainage channels formed therein adjacent the outlet aperture, each of the drainage channels providing fluid communication between one of the outlet ports and the outlet aperture, wherein a cross-sectional area occupied by each of the flow channels is equal to a cross-sectional area occupied by each of the drainage channels, and a width of each of the flow channels, a width of each of the outlet ports, and a width of each of the drainage channels are equal, to provide a constant cross-sectional area flow path, and wherein the constant cross-sectional area flow path militates against a potential for flooding or stagnation in the fuel cell.

* * * * *